(12) United States Patent
Frankholz et al.

(10) Patent No.: US 7,597,270 B2
(45) Date of Patent: Oct. 6, 2009

(54) CONTROL ASSEMBLY FOR THERMOSTATIC MIXING

(75) Inventors: Christian Frankholz, Fröndenberg (DE); Kai Huck, Wetter (DE)

(73) Assignee: Grohe Water Technology AG & Co. KG, Hemer (DE)

( * ) Notice: Subject to any disclaimer, the term of this patent is extended or adjusted under 35 U.S.C. 154(b) by 834 days.

(21) Appl. No.: 11/179,254

(22) Filed: Jul. 12, 2005

(65) Prior Publication Data

US 2007/0012791 A1    Jan. 18, 2007

(30) Foreign Application Priority Data

Jul. 26, 2004    (DE)    .................. 10 2004 036 182

(51) Int. Cl.
*G05D 23/13* (2006.01)
*F16K 11/078* (2006.01)
(52) U.S. Cl. .............. 236/12.2; 236/93 A; 137/625.17
(58) Field of Classification Search ......... 251/286–288, 251/318–325; 236/12.1, 12.2, 12.12, 12.22, 236/93 A, 99 J, 100; 137/100, 625.17
See application file for complete search history.

(56) References Cited

U.S. PATENT DOCUMENTS

| | | | | |
|---|---|---|---|---|
| 4,544,132 A | * | 10/1985 | Allen et al. ............... | 251/318 |
| 5,931,374 A | * | 8/1999 | Knapp ....................... | 236/12.2 |
| 5,937,892 A | * | 8/1999 | Meisner et al. ............ | 137/375 |
| 6,988,669 B2 | | 1/2006 | Nember ..................... | 236/12.2 |
| 7,073,725 B2 | * | 7/2006 | Swadling ................... | 236/12.2 |
| 7,240,850 B2 | | 7/2007 | Beck ......................... | 236/12.2 |

FOREIGN PATENT DOCUMENTS

DE    7713834    8/1977

OTHER PUBLICATIONS

Palm Inventor Name Search In Palm: p. 1 of 1 Inventor Huck.*
Palm Inventor Name Search In Palm: p. 1 of 1 Inventor Frankholz: p. 1 of 1.*

\* cited by examiner

*Primary Examiner*—Marc E Norman
(74) *Attorney, Agent, or Firm*—Andrew Wilford

(57) ABSTRACT

A mixing valve has a valve housing, a thermostatic valve in the housing having a collar extending outward along an axis from the housing, and a stem axially shiftable in the collar. A sleeve surrounds the collar. A retaining part and interengaging screwthread formations between the part and the housing press the part against the sleeve and collar and thereby secure the collar and the sleeve on the housing against axial and angular displacement relative thereto. A handle is rotatably supported on the sleeve and threaded on the stem.

13 Claims, 3 Drawing Sheets

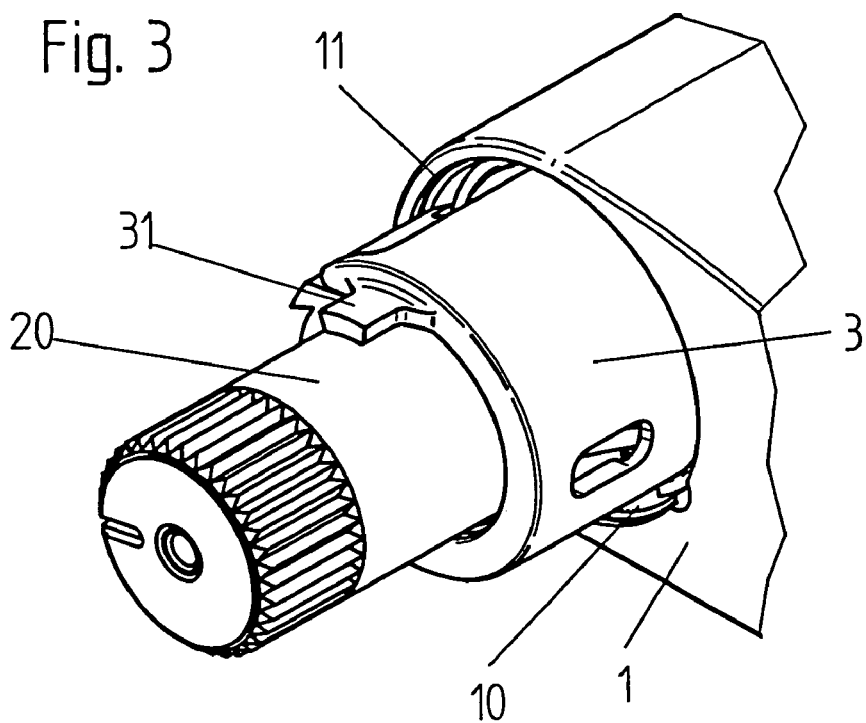
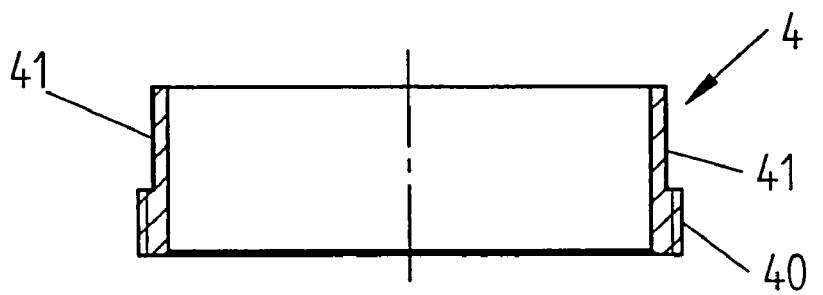
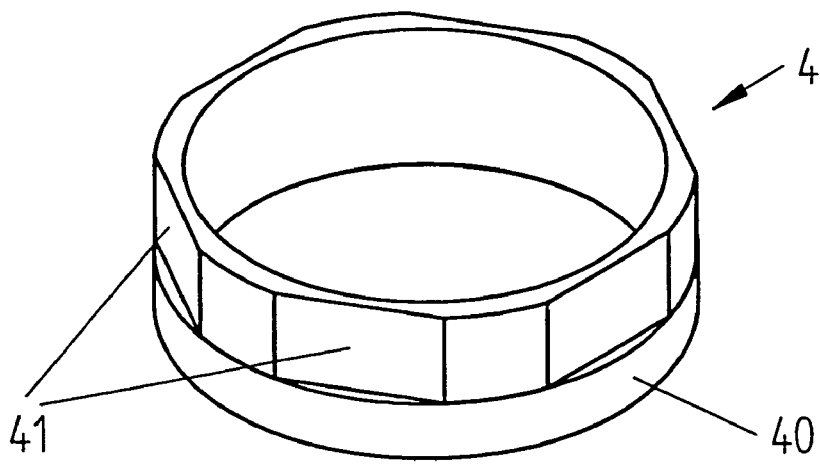

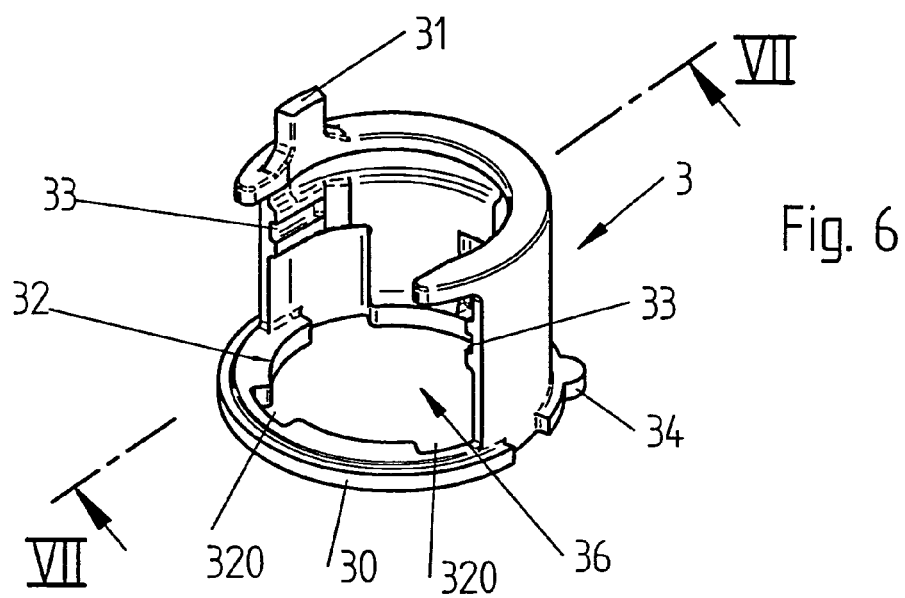
Fig. 6
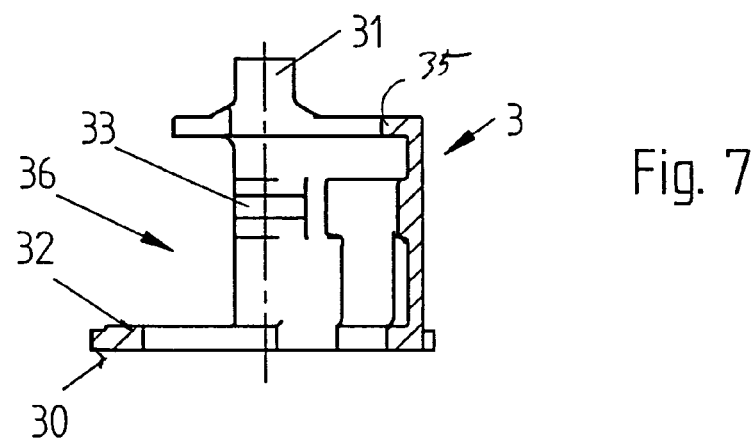
Fig. 7
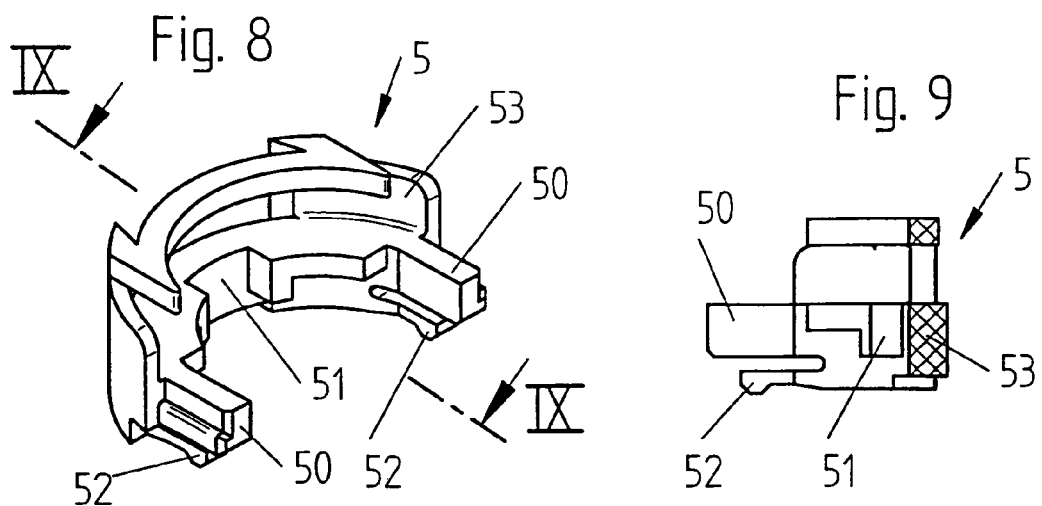
Fig. 8
Fig. 9

CONTROL ASSEMBLY FOR THERMOSTATIC MIXING

FIELD OF THE INVENTION

The present invention relates to a thermostatic mixing valve. More particularly this invention concerns a control knob or assembly for such a valve.

BACKGROUND OF THE INVENTION

A thermostatic mixing valve such as described in U.S. Pat. No. 6,648,234 has a housing and a stem extending along an axis in the housing and axially displaceable to adjust the thermostatically regulated temperature of the valve. A tubular core body fixed in the housing and aligned with the stem holds a coupling body axially displaceable in the core body, having an inner end axially engageable with the stem and an outer end formed with a screwthread. Interengaging formations on the coupling body and the core body inhibit rotation of the coupling body in the core body while permitting axial displacement of the coupling body in the core body. A knob rotatable about the axis has a screwthread meshing with the screwthread of the coupling-body outer end. A retainer engaged between the knob and the core body inhibits axial displacement of the knob on the core body and permits rotation of the knob on the core body so that rotation of the knob on the core body axially shifts the coupling body in the core body.

Thus with this arrangement the control knob can rotate but not move axially, but its rotation is converted into the required axial displacement of the coupling body and valve stem. Thus the user rotates the knob to adjust temperature but the axial position of the knob remains the same.

The problem with such an arrangement is that the various elements of the knob assembly, which are typically made of plastic, are occasionally subjected to substantial forces radial of the rotation axis. They can be damaged for instance if a user pulls the knob too forcibly to the side or something is dropped on the knob.

OBJECTS OF THE INVENTION

It is therefore an object of the present invention to provide an improved control assembly for thermostatic mixing valve.

Another object is the provision of such an improved control assembly for thermostatic mixing valve that overcomes the above-given disadvantages, in particular that is designed to be particularly rugged.

SUMMARY OF THE INVENTION

A mixing valve has according to the invention a valve housing, a thermostatic valve in the housing having a collar extending outward along an axis from the housing, and a stem axially shiftable in the collar. A sleeve surrounds the collar. A retaining part and interengaging screwthread formations between the part and the housing press the part against the sleeve and collar and thereby secure the collar and the sleeve on the housing against axial and angular displacement relative thereto. A knob is rotatably supported on the sleeve and threaded on the stem.

Thus with this invention the knob is carried on the sleeve, not on the collar. This makes it possible according to the invention for the valve to have a plastic casing integrally formed with the collar. The valve housing and sleeve are made of metal so that they can be much stronger. Normally the valve is a replaceable cartridge or insert, so that with the system of this invention this cartridge can be made with an inexpensive plastic casing without in any way weakening the valve assembly. In addition according to the invention the retaining part and screw formations are metal.

The retaining part according to the invention is a ring surrounding the sleeve and collar and bearing axially inward thereon. The screwthread formations include an external screwthread on the ring and an internal screwthread on the housing. Moreover, the valve housing is formed with an axially outwardly directed shoulder. The sleeve has a radially outwardly directed flange pressed axially inwardly against the shoulder by the ring. The sleeve and retaining ring also press the valve cartridge against a shoulder of the housing, so that this single ring actually serves to hold the entire assembly together. Alternately the part could be one or more screws bearing on the sleeve and threaded into the valve body.

The sleeve in accordance with the invention has a stop limiting rotation of the knob on the sleeve.

The collar according to the invention is formed with a plurality of angularly spaced and radially outwardly projecting tabs. The sleeve is formed with a radially inwardly projecting flange in turn formed with a complementary plurality of angularly spaced and inwardly open cutouts dimensioned such that the tabs can slide axially along the cutouts. The collar is formed at axially inner ends of the sleeve with a radially outwardly open groove complementary to the inwardly projecting flange. These formations thus make a bayonet connection so that the sleeve can be fitted over the collar, then rotated slightly to lock it in place. This is normally done before the valve cartridge formed with the collar is fitted to the valve housing so that, according to another feature of the invention radially interfitting formations on the sleeve and housing can establish and lock in the desired angular position of the sleeve and cartridge in the valve housing.

Furthermore according to the invention a latch element is fittable radially to the sleeve and formed with a radially inwardly open cutout complementary to the tabs so that, when the inwardly projecting flange is in the groove, the cutouts are angularly offset from the tabs, and the part is fitted to the sleeve, the latch element locks the sleeve against angular movement on the collar. Thus as mentioned above the sleeve is fitted to the collar bayonet fashion, then the latch element is snapped on from the side to lock the sleeve in place.

More particularly the latch element has a pair of tangentially extending arms, and the sleeve has a pair of complementary tangentially open guide grooves in which the arms are receivable when the latch element is fitted to the sleeve. Each of the tabs has a radially outwardly open groove seat and the arms have formations elastically engageable in the groove seats. The latch element is unitarily formed with the arms of plastic. Thus no tools are needed to put in this latch element and lock the sleeve and collar together. When the ring is fitted over the sleeve it in turn secures the latch element solidly in place to make the entire assembly very strong, while still being susceptible of disassembly for instance to replace the valve cartridge having the collar.

BRIEF DESCRIPTION OF THE DRAWING

The above and other objects, features, and advantages will become more readily apparent from the following description, reference being made to the accompanying drawing in which:

FIG. 3 is a perspective view of internal parts of the assembly;

FIG. 4 is an axial section through the retaining ring of the assembly;

FIG. 5 is a perspective view of the retaining ring;

FIG. 6 is a perspective view of the mounting sleeve of the assembly;

FIG. 7 is a section taken along line VII-VII of FIG. 6;

FIG. 8 is a perspective view of the latch element of the assembly; and

FIG. 9 is a section taken along line IX-IX of FIG. 8.

SPECIFIC DESCRIPTION

Figure 1:
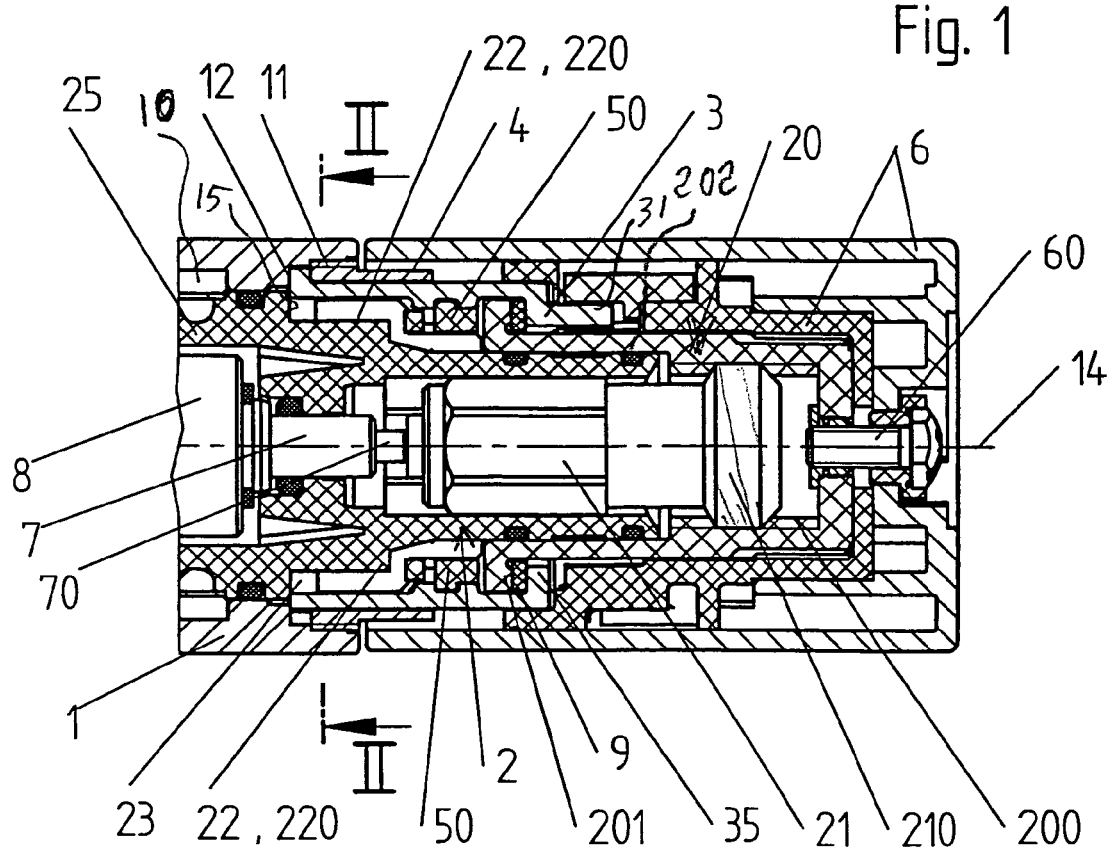
FIGS. 1 and 2 are sections through the valve assembly according to the invention along respective lines I-I and II-II of respective FIGS. 2 and 1.
Figure 2:
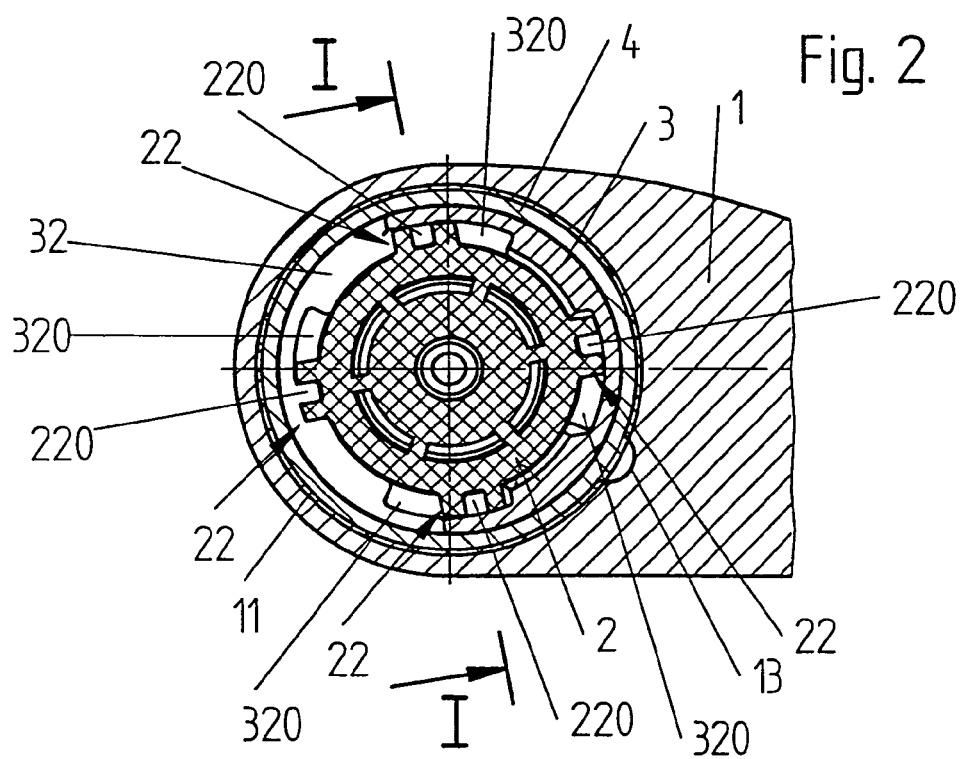

As seen in FIGS. 1 and 2 a cast metallic valve housing 1 is formed centered on an axis 14 with a seat bore 10. Inside the body 1, a thermostatic mixing valve has an injection-molded plastic casing 25 formed centered on the axis 14 with a tubular collar 2 and holds an axially displaceable valve body 8. A thermostatic element 7 is braced axially inwardly against the valve body 8 and has an axially outwardly extending stem 70 that shifts axially with temperature, in effect changing the overall axial length of the element 7 with temperature as is well known in the art.

An actuating body 21 of hexagonal section is axially shiftable in the collar 2, bears axially inward on the stem 70, and has an externally threaded head 210 that projects out of the collar 2. The collar 2 is internally of a shape complementary to that of the actuator 21 so that this body 21 can move axially in it but not rotate about the axis 14. A control nut 20 centered on the axis 14 and journaled via glide rings 202 on the collar 2 has an internal screwthread 200 into which the head 210 is threaded. In addition the nut 20 has a radially outwardly projecting flange 201 that bears axially outward via a glide washer 9 on a radially inwardly projecting flange 35 of a metallic mounting sleeve 3 (see FIGS. 6 and 7 also). Thus the nut 20 cannot move axially so that its rotation will be transmitted via its screwthread 200 to the head 210 of the nonrotatable actuating body 21 to axially displace this actuator 21, so that rotation about the axis 14 of the nut 20 is converted into axial shifting of the body 21.

The mounting sleeve 3 has at its inner end a radially outwardly projecting flange 30 that sits on an axially outwardly facing planar shoulder 12 of the metallic valve housing 1 and on an axially outwardly facing planar shoulder 15 of the casing 25. A retaining ring 4 (see FIGS. 4 and 5) has an external screwthread 40 engaged in an internal screwthread 11 of the body 1 just outward of the shoulder 12 and presses this flange 30 solidly against the shoulders 12 and 15, thereby fixing the metallic sleeve 3 in place on the metallic valve housing 1 and holding the valve casing 25 in position in the housing 1. Flats 41 on the outside of the ring 4 allow a tool to be fitted to it so that it can be screwed tightly in place, and unscrewed if necessary. The flange 30 is formed with a radially outwardly projecting tab 34 that fits in a complementary radially inwardly and axially outwardly open seat 13 formed in the body 1 to establish and fix the angular position of the sleeve 3.

A two-part plastic knob or handle 6 is fixed by a centered screw 60 to a metallic insert in the outer end of the nut 20 and extends axially inward all the way to immediately adjacent the housing 1. It is journaled on the metallic sleeve 3. Rotation of this knob 6 turns the nut 20 which axially shifts the actuating body 21 and adjusts the position of the valve housing 8, with the thermostatic element 7 getting shorter or longer according to temperature to keep the temperature of the mixed water outputted by the valve the same. An axially projecting tab or formation 31 on the sleeve 3 limits rotation of the knob 6 to less than 360°. Hence the sleeve 3 braces the knob 6 radially, so that any radial forces exerted on the knob 6 are transmitted through the sleeve 3, which is secured by the ring 4 to the body 1, to the body 1. Thus this ring 4 holds this sleeve 3 and the valve casing 25 in place.

As shown in FIGS. 6 and 7 the sleeve 3 is formed level with the outwardly directed flange 30 with an inwardly projecting flange 32 formed with four angularly equispaced cutouts or notches 320. The collar 2 is formed with four complementarily radially outwardly projecting, axially extending, and angularly equispaced tabs 22 that can slide axially through the cutouts 320 as shown in FIG. 2, and that are each formed with a central axially throughgoing and radially outwardly open notch 220. Axial inner ends of these tabs 22 define in the collar 2 with the shoulder 12 a radially outwardly open square-section annular groove 23 (FIG. 1) of an axial dimension equal to slightly more than that of the flange 32. Thus the sleeve 3 can be pushed axially inward over the collar 2 with the cutouts 320 sliding inward over the tabs 22 until the flange 32 is against the shoulder 12, whereupon the sleeve 3 can be limitedly rotated to shift the cutouts 320 out from alignment with the tabs 22, thereby locking the sleeve 3 axially to the collar 2.

Once thus positioned a plastic latch element 5 shown in FIGS. 8 and 9 can be fitted to a radially throughgoing and axially outwardly open cutout 36 of the sleeve 3. To this end the element 5 has an arcuate wall portion 53 that fits in and closes the cutout 36 and two guides 50 that fit in guide grooves 33 of the sleeve 3. Between the guides 50, the wall 53 is formed with a radially inwardly open cutout 51 of a shape complementary to that of the tabs 22. Elastically deformable fingers 52 engage, when the element 5 is fitted to the sleeve 3, in the notches 220 of the tabs 22 flanking the tab 22 that fits in the cutout 51. In this manner the sleeve 3 is angularly locked on the collar 2. Then, the retaining ring 4 can be screwed in place to lock the part 5 in the part 3, thereby rigidly connecting all these parts together.

Thus according to the invention the nut 20 is axially braced in one direction on the metallic sleeve 3 and on the other side on the plastic collar 2, so that it cannot move axially relative to the valve housing 1. The thermostat element 7 that is pressed by an unillustrated spring against the valve actuator 21 is thus shifted axially by rotating the knob 6 and nut 20 on the actuator 21. The thermostat element 7 will be affected by the temperature of the water passing through the valve and will automatically change length to keep the temperature of the outputted water constant.

We claim:

1. A mixing valve comprising:

a valve housing;

a thermostatic element in the housing;

a plastic casing surrounding the thermostatic element and formed with a collar extending outward along an axis from the housing;

a threaded stem axially shiftable in the collar and bearing axially on the thermostatic element;

a metallic sleeve surrounding and fixed to the collar;

means including a retaining part and interengaging screwthread formations between the part and the housing for pressing the part against the sleeve and collar of the casing and thereby securing the collar and the sleeve on the housing against axial and angular displacement relative thereto; and a handle assembly rotatably supported and axially fixed on the sleeve and threaded on the stem, whereby rotation of the assembly axially shifts the stem against the thermostatic element.

2. The mixing valve defined in claim 1 wherein the part and screw formations are metal.

3. The mixing valve defined in claim 1 wherein the part is a ring surrounding the sleeve and collar and bearing axially inward thereon, the screwthread formations including an external screwthread on the ring and an internal screwthread on the housing.

4. The mixing valve defined in claim 3 wherein the valve housing is formed with an axially outwardly directed shoulder, the sleeve having a flange pressed axially inwardly against the shoulder by the ring.

5. The mixing valve defined in claim 1 wherein the sleeve has means including a stop limiting rotation of the handle assembly on the sleeve.

6. The mixing valve defined in claim 1 wherein the collar is formed with a plurality of angularly spaced and radially outwardly projecting tabs, the sleeve being formed with a radially inwardly projecting flange in turn formed with a complementary plurality of angularly spaced and inwardly open cutouts dimensioned such that the tabs can slide axially along the cutouts, the collar being formed at an axially inner end of the sleeve with a radially outwardly open groove complementary to the inwardly projecting flange.

7. The mixing valve defined in claim 1 wherein the sleeve has a radially projecting tab, the valve housing having a radially oppositely projecting recess complementary to and receiving the tab, whereby the tab and recess rotationally lock the sleeve on the housing.

8. The mixing valve defined in claim 1 wherein the handle assembly includes a cup-shaped outer part journaled on the sleeve, a nut received on the outer part and threaded on the stem, and a screw locking the outer part and the nut together.

9. A mixing valve comprising:
a valve housing;
a thermostatic element in the housing;
a collar surrounding the element, extending outward along an axis from the housing, and formed with a plurality of angularly spaced and radially outwardly projecting tabs and at an axially inner end of the sleeve with a radially outwardly open groove;
a stem axially shiftable in the collar and bearing axially on the thermostatic element;
a sleeve surrounding the collar and formed with a radially inwardly projecting flange complementary to the groove and formed with a plurality of angularly spaced and inwardly open cutouts complementary to the tabs and dimensioned such that the tabs can slide axially along the cutouts;
means including a retaining part and interengaging screwthread formations between the part and the housing for pressing the part against the sleeve and collar and thereby securing the collar and the sleeve on the housing against axial and angular displacement relative thereto; and
a handle assembly rotatably supported on the sleeve and threaded on the stem; and
a latch element fittable radially to the sleeve and formed with a radially inwardly open cutout complementary to the tabs, whereby when the inwardly projecting flange is in the groove, the cutouts are angularly offset from the tabs, and the part is fitted to the sleeve, the latch element locks the sleeve against angular movement on the collar.

10. The mixing valve defined in claim 9 wherein the latch element has a pair of tangentially extending arms, the sleeve having a pair of complementary tangentially open guide grooves in which the arms are receivable when the latch element is fitted to the sleeve.

11. The mixing valve defined in claim 10 wherein each of the tabs has a radially outwardly open groove seat and the arms have formations elastically engageable in the groove seats.

12. The mixing valve defined in claim 11 wherein the latch element is unitarily formed with the arms of plastic.

13. The mixing valve defined in claim 10 wherein the sleeve is formed with a cutout into which the latch element fits complementarily.

* * * * *